US012180105B1

United States Patent
Khan et al.

(10) Patent No.: US 12,180,105 B1
(45) Date of Patent: Dec. 31, 2024

(54) EFFECTIVE METHOD FOR PRODUCING GLASS WASTE POWDER AS A PRECURSOR FOR THE PRODUCTION OF NANOSILICA

(71) Applicant: KING SAUD UNIVERSITY, Riyadh (SA)

(72) Inventors: Mohammad Iqbal Khan, Riyadh (SA); Galal Mohamed Fares, Riyadh (SA); Yassir Mohammed Abbas, Riyadh (SA); Fahad Khshim Alqahtani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/615,277

(22) Filed: Mar. 25, 2024

(51) Int. Cl.
*B02C 17/00* (2006.01)
*B02C 17/04* (2006.01)
*B02C 17/20* (2006.01)
*C03B 19/10* (2006.01)

(52) U.S. Cl.
CPC ............ *C03B 19/104* (2013.01); *B02C 17/04* (2013.01); *B02C 17/205* (2013.01)

(58) Field of Classification Search
CPC ............................. B02C 17/205; B02C 17/04
See application file for complete search history.

(56) References Cited

U.S. PATENT DOCUMENTS

| | | | |
|---|---|---|---|
| 6,471,148 B1 * | 10/2002 | Mase, Jr. ................ | B02C 17/06 241/178 |
| 2014/0197257 A1 * | 7/2014 | Foucher ................ | B02C 17/205 241/98 |

FOREIGN PATENT DOCUMENTS

| | | | | |
|---|---|---|---|---|
| CN | 108010602 B | 1/2020 | | |
| CN | 111036350 A | * 4/2020 | ............ | B02C 13/13 |
| CN | 114349460 A | 4/2022 | | |
| CN | 112777980 B | 5/2022 | | |
| CN | 113617496 B | 1/2023 | | |

OTHER PUBLICATIONS

Mostafa Samadi et at., "Influence of Glass Silica Waste Nano Powder on the Mechanical and Microstructure Properties of Alkali-Activated Mortars", DOI: https://doi.org/10.3390/nano10020324; Feb. 14, 2020.
Alharbi, Yousef R et al. "Engineering Properties of High-Volume Fly Ash Modified Cement Incorporated with Bottle Glass Waste Nanoparticles" DOI: https://doi.org/10.3390/su141912459; Sep. 30, 2022.
Ghasan Fahim Huseien et al., "Alkali-activated mortars blended with glass bottle waste nano powder: Environmental benefit and sustainability" DOI: https://doi.org/10.1016/j.jclepro.2019.118636; Jan. 10, 2020.
Mugahed Amran et al., "Innovative use of fly ash-finely powdered glass cullet as a nano additives for a sustainable concrete: Strength and microstructure and cost analysis" DOI: https://doi.org/10.1016/j.cscm.2022.e01688; Dec. 2022.

* cited by examiner

*Primary Examiner* — Faye Francis
(74) *Attorney, Agent, or Firm* — Nath, Goldberg & Meyer; Joshua B. Goldberg

(57) ABSTRACT

The present disclosure relates to a method of making nanoparticles from glass, the method including: gathering glass waste; hammering the glass waste into ready to grind pieces; adding an amount of the ready to grind pieces into a grinding bowl; adding steel balls to the grinding bowl; grinding the ready to grind pieces; and obtaining a powder containing the nanoparticles.

17 Claims, 5 Drawing Sheets

EFFECTIVE METHOD FOR PRODUCING GLASS WASTE POWDER AS A PRECURSOR FOR THE PRODUCTION OF NANOSILICA

BACKGROUND

1. Field

The disclosure of the present patent application relates to a method for producing nanoparticles from glass and, particularly, to an effective method of making nanosilica from glass waste.

2. Description of the Related Art

Glass can be infinitely recyclable without loss in quality. Recycling glass has many proven environmental benefits—it reduces emissions, saves energy, and reduces consumption of raw materials. As a common household item, recycling the material maintains much public support. However, many recycling facilities are no longer accepting glass for a variety of reasons including contamination, the hazard of broken glass, the weight of class, and an ever-changing market.

Many recycling facilities are no longer accepting glass because glass has become a contaminant. In a single stream recycling system, glass is increasingly becoming the contaminant. Broken glass can contaminate other recyclables like paper and cardboard, lowering their value. Recyclers are increasingly focused on quality and reducing contamination to maintain the value of their recyclable materials.

Another reason recycling facilities are no longer accepting glass is because broken glass poses a safety issue. Broken glass is not only a safety hazard to workers, but it can also damage machines at recycling facilities. As a result, recycling glass is associated with increasing processing costs.

Further, many recycling facilities are no longer accepting glass because broken glass is difficult to sort. Most manufacturers require recyclable glass to be sorted by color in order to produce high quality glass bottles and jars. Glass is difficult to sort when broken, and if broken down too finely, glass may become too difficult to reprocess. When recyclers find it too difficult or expensive to separate out glass, they send the entire stream to a landfill. According to Recycle Across America, "More than 28 billion glass bottles and jars end up in landfills every year—that is the equivalent of filling up two Empire State Buildings every three weeks."

Another reason recycling facilities are no longer accepting glass is because glass is heavy in bulk. Glass is heavy and expensive to transport. Faced with high costs, some communities are paying to have the glass specially crushed for use in construction. And while this is certainly a use for glass, it is not necessarily the best use.

Yet another reason recycling facilities are no longer accepting glass is because the demand for recycled or recyclable glass has decreased. Mandatory glass recycling programs in the 1980s flooded the market with recyclable glass, causing prices to drop. Over the past two decades, glass has also been replaced by aluminum and plastic for some products, leading to less demand.

However, glass is still an abundant product and can be useful when repurposed. The recycling of waste glass into valuable products becomes economically effective through the transformation of the waste glass into a worthwhile product.

Thus, a method for repurposing glass waste into a more renewable product is desired.

SUMMARY

The present disclosure involves a method of converting glass waste into nanoparticles using a subsequent high-energy ball milling process that utilizes a phase separation process to convert the waste into nanoparticles. A series of optimized grindings are performed to increase the quantity of nanoparticles.

The present disclosure also relates to a method of making nanoparticles from glass, the method comprising: gathering glass waste; hammering the glass waste into ready to grind pieces; adding an amount of the ready to grind pieces into a grinding bowl; adding steel balls to the grinding bowl; grinding the ready to grind pieces; and obtaining a powder containing the nanoparticles.

These and other features of the present subject matter will become readily apparent upon further review of the following specification.

BRIEF DESCRIPTION OF THE DRAWINGS

FIG. 2A shows adding an optimized quantity to grinder container; FIG. 2B is an image taken after the prolonger grinding process; FIG. 2C shows cake-formation of nano-glass particles; and FIG. 2D shows recovery of grinding balls.

FIG. 3 is a graph of a particle-size distribution (PSD) analysis of glass powder (GP).

FIG. 4 is a Scanning Electron Microscopy (SEM) photomicrograph of ground GP proving the existence of nano-sized particles.

DETAILED DESCRIPTION OF THE PREFERRED EMBODIMENTS

Figure 1A:
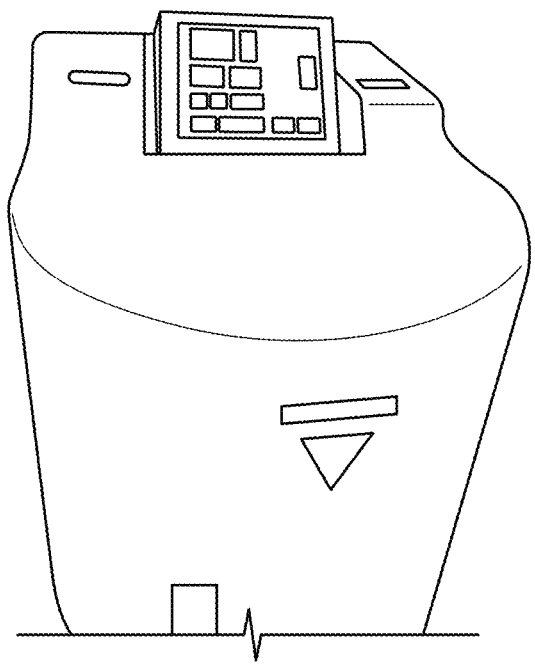
FIGS. 1A, 1B, 1C, 1D, 1E, and 1F show a representation of equipment used in an embodiment of consecutive grinding using high-energy ball milling grinders FIGS. 1A and 1B; their corresponding internal setups FIGS. 1C and 1D; and the pre-cleaning process of balls FIGS. 1E and 1F with sand before using to obtain a nano-sized glass silica.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present disclosure involves a method of converting glass waste into nanoparticles using a subsequent high-energy ball milling process that utilizes a phase separation process to convert the waste into nanoparticles. A series of optimized grindings are performed to increase the quantity of nanoparticles.

Figure 1B:
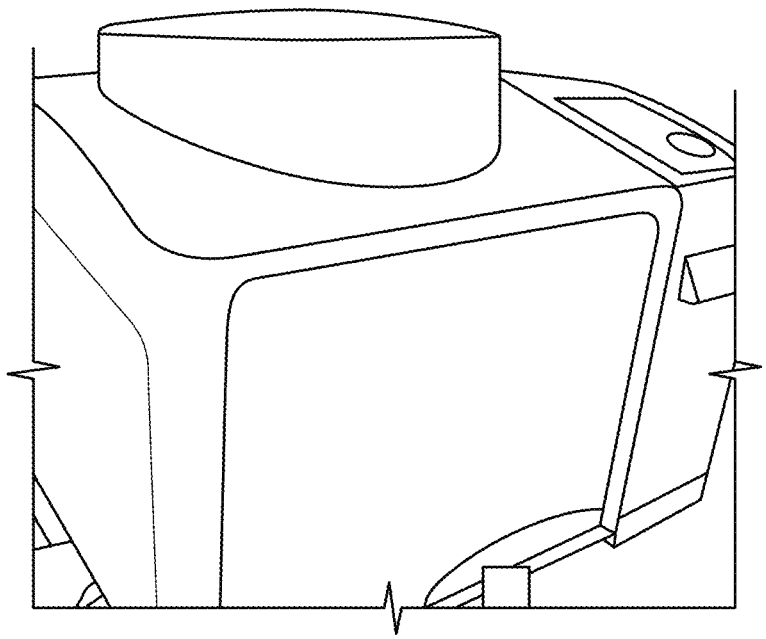
Figure 1C:
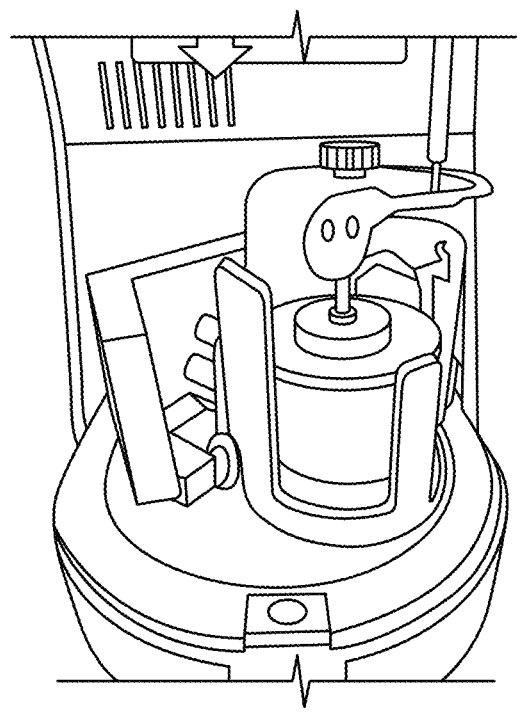
Figure 1D:
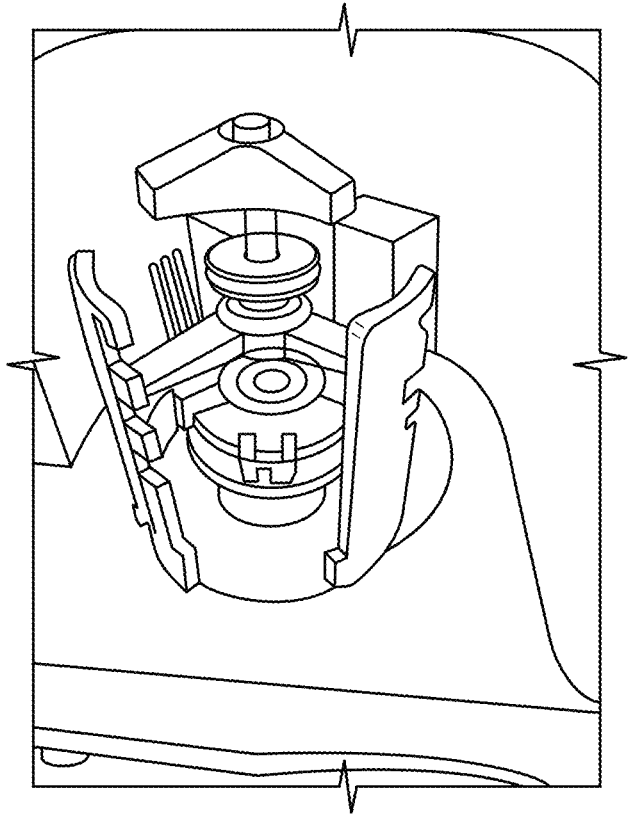
Figure 1E:
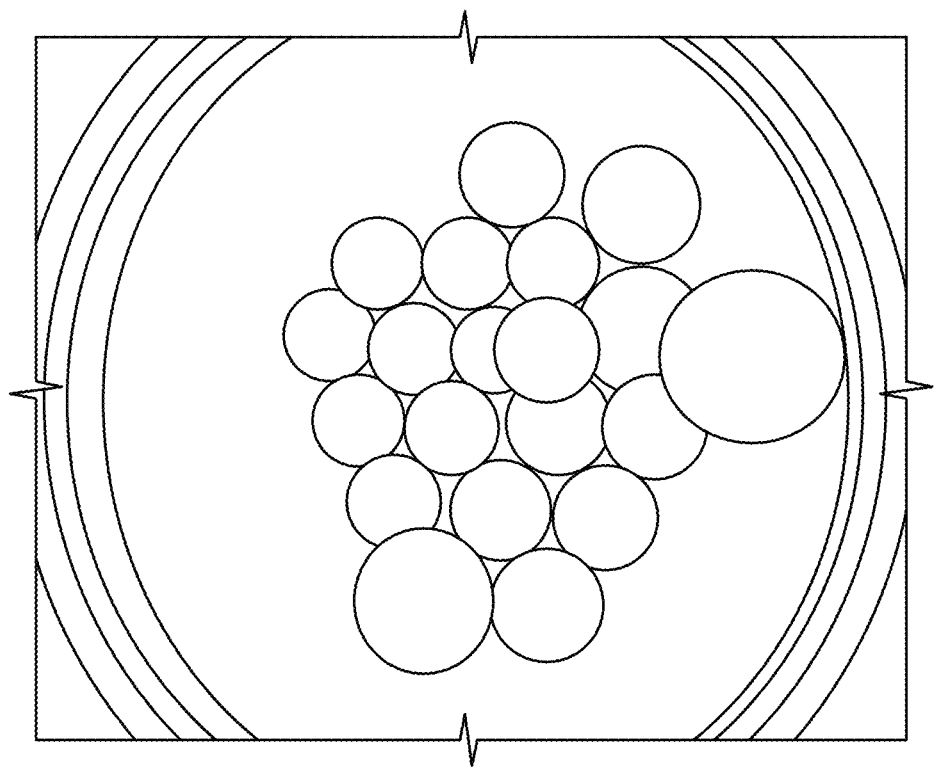
Figure 1F:
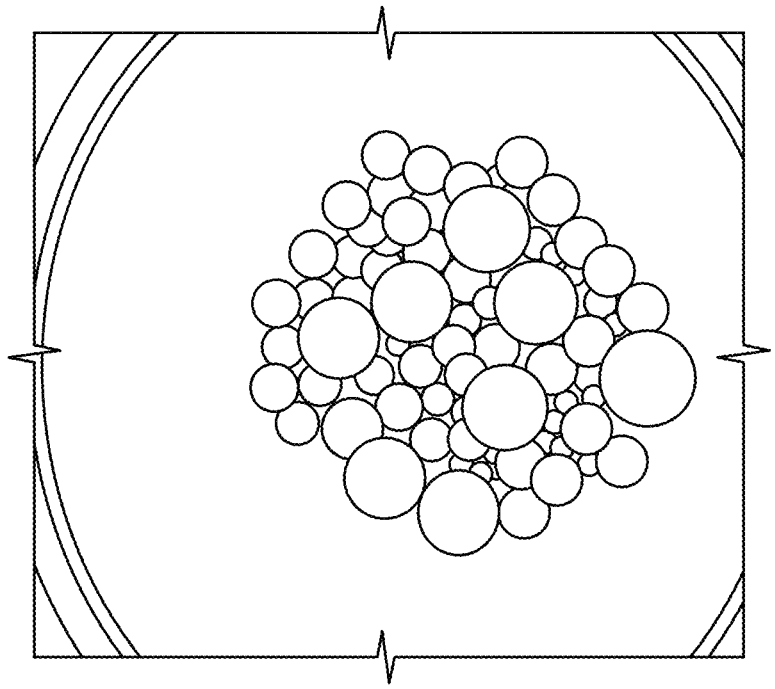
Figure 2A:
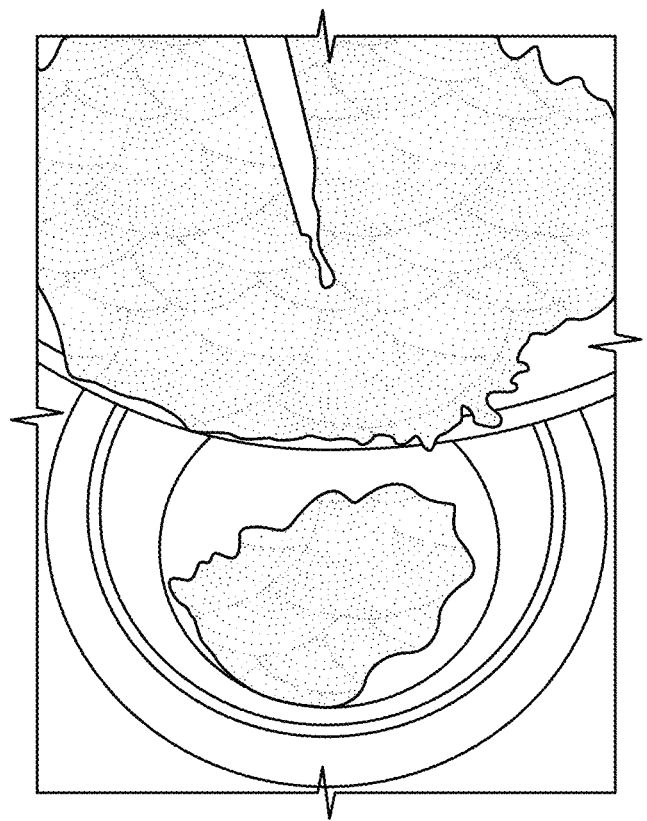
FIGS. 2A, 2B, 2C, and 2D show an embodiment of the process of converting glass powder into nano-glass using the high-impact energy grinding process.
Figure 2B:
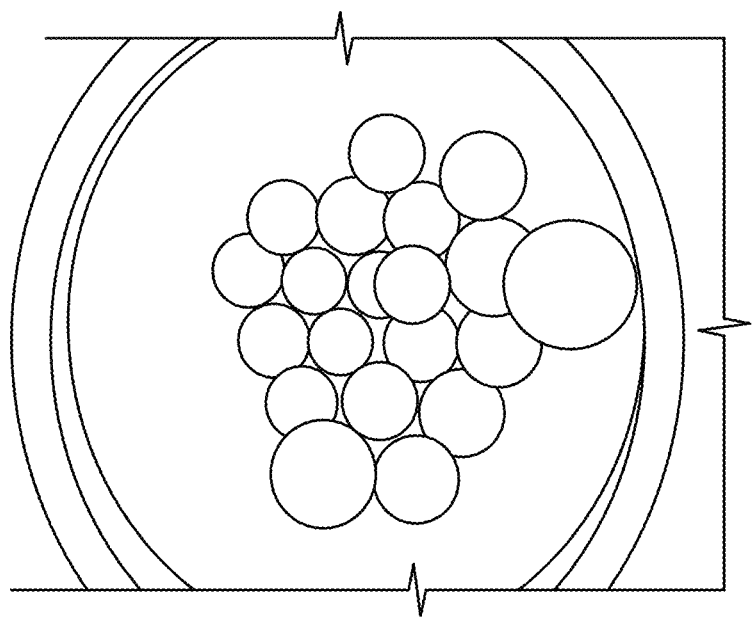
Figure 2C:
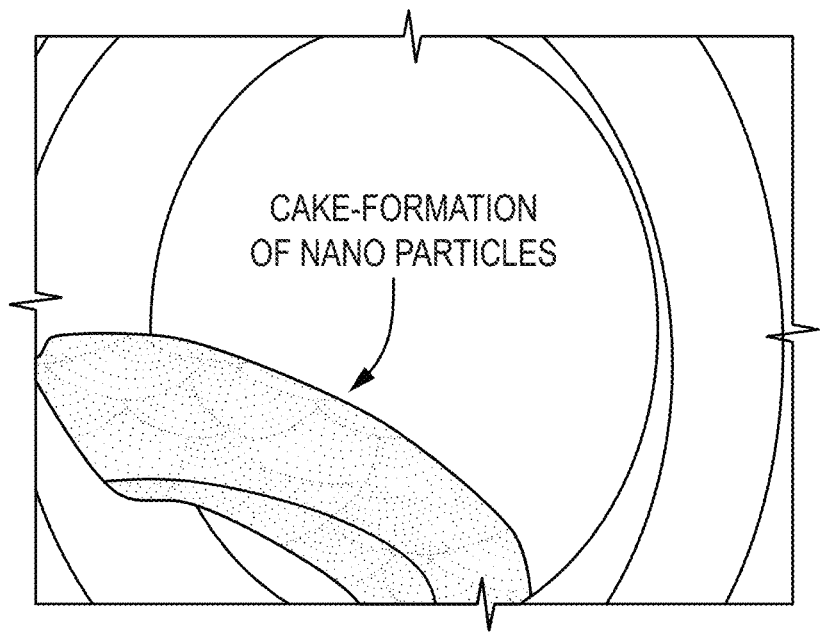
Figure 2D:
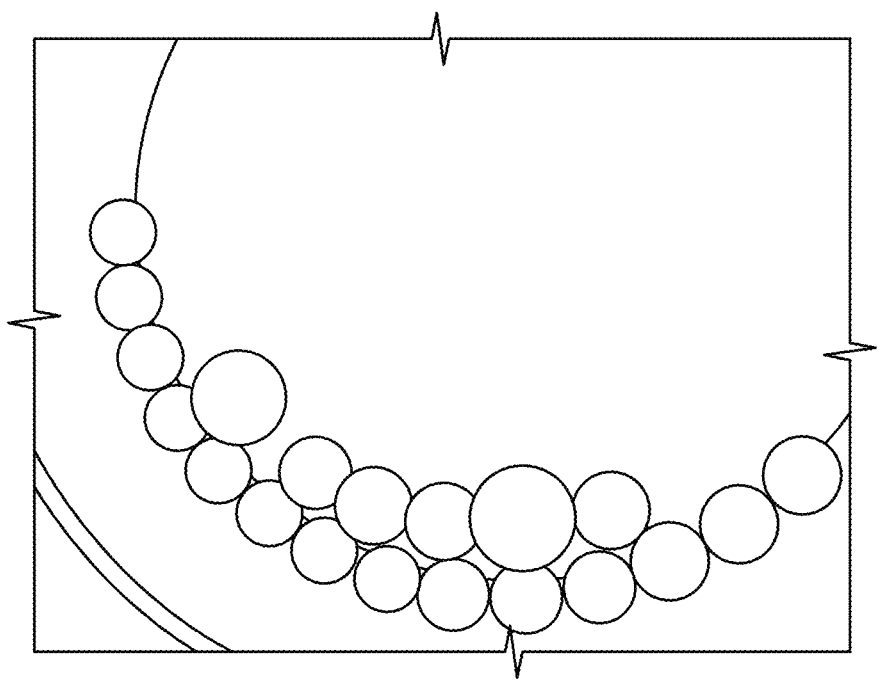

In the method as described herein, high-energy ball milling is used to grind the materials. Two types of consecutive grinding using different grinders are followed, as shown in FIGS. 1A and 1B. In particular embodiments, a Pulversette® 6 (Pulversette is a registered trademark of Frisch GmbH of Germany) grinder may be used as illustrated in FIG. 1A. The Pulversette® Grinder has grinding bowl sizes of about 20 mL to about 80 mL. The rotation speed on a Pulversette® 6 grinder can range from about 150 PRM to about 2200 RPM. In other embodiments, other grinders of similar strength and size may be used.

In FIG. 1B, a Retsch® (Retsch is a registered trademark of Retsch GmbH of Germany) grinder is illustrated. Retsch® grinders may include two grinding bowls per machine ranging in volumes of about 12 mL to about 500 mL. The Retsch® grinders may also have motors that range in speed from 50 RPM to 800 RPM. In other embodiments, other grinders of similar strength and size may be used.

The elevated grindability of glass powder makes rendering nano-sized powder achievable. The end-product of this process may be a nanoscale glass powder. By way of comparison, the volume of the balls used in the grinding process is approximately 4.5 times greater than the volume of solid matter to be ground. With regard to the number of balls in the Pulversette® 6 grinder, in an embodiment there can be up to 20 balls, or about 20 balls, or 20 balls, whereas there can be up to 26 balls, about 26 balls, or 26 balls in the Retsch® grinder. In the Pulversette® grinder, the motor RPM can be set at about 300, under which conditions the device can be run for about 300 minutes continuously with about 10-minute intervals between rotations. On the other hand, the Retsch® grinder can be adjusted about ten times, or ten times, at a maximum setting of about 600 RPM for a total of about 15 minutes. An embodiment of the entire process of grinding until obtaining the cake formation of nanoparticles is demonstrated in FIGS. 2A, 2B, 2C, and 2D.

In an embodiment, the produced nanoparticles can comprise nanosilica particles. In another embodiment, the produced nanoparticles can comprise spherical nanoparticles. In a further embodiment, the produced nanoparticles can have a particle size less than 50 nm.

In a key aspect, the present methods can achieve producing nanoparticles from glass waste without using any grinding agents or wet grinding processes in the presence of chemicals.

The present disclosure also relates to a method of making nanoparticles from glass, the method comprising: gathering glass waste; hammering the glass waste into ready to grind pieces; adding an amount of the ready to grind pieces into a grinding bowl; adding steel balls to the grinding bowl; grinding the ready to grind pieces; and obtaining a powder containing the nanoparticles.

In other embodiments, the hammering the glass waste into ready to grind pieces may comprise manually crushing glass with one of a hammer and a mallet. In other embodiments, the hammering the glass waste into ready to grind pieces can comprise grinding the glass waste in an automatic glass crusher, or a balling crusher machine. Non-limiting examples of a suitable balling crusher machine may include the Pulversette® 6 or Retsch® Grinder as described above, or other industrial grinders.

In a further embodiment, the grinding bowl may have a capacity of about 80 mL to about 500 mL.

In other embodiments, 20 balls, or 20 grinding balls, may be added to the grinding bowl.

In another embodiment, the grinding bowl may be placed in a grinder machine and the grinder machine can have a motor with a speed of about 300 RPM. The motor may be run continuously for about 300 minutes with about 10-minute intervals between rotations.

In a further embodiment, the grinding bowl may have a capacity of about 12 mL to about 500 mL.

In other embodiments, 26 balls, or 26 grinding balls, may be added to the grinding bowl.

In another embodiment, grinding the ready to grind pieces may comprise running a grinding machine at about 600 RPM for at least about 15 minutes, or about 15 minutes.

In a further embodiment, the produced nanoparticles can have a density of about 2.48 g/cm$^3$.

In an additional embodiment, once produced, the nanoparticles can be entered into a suspension system to be separated using a funnel, representing a cost-effective separation system.

The present disclosure also relates to a method of making nanoparticles from glass, the method comprising: gathering glass waste; hammering the glass waste into ready to grind pieces; adding an amount of the ready to grind pieces into a grinding bowl of a grinding machine; adding 20 steel balls to the grinding bowl; grinding the ready to grind pieces in the grinding machine for about 300 minutes at about 300 RPM; and obtaining a powder containing the nanoparticles.

In embodiments of the present methods, hammering the glass waste into ready to grind pieces can comprise one of manually crushing glass with one of a hammer and a mallet, grinding the glass waste in an automatic glass crusher, or grinding the glass waste using a balling crusher machine.

In other embodiments of the present method, the produced nanoparticles can have a density of about 2.48 g/cm$^3$.

The present disclosure also relates to a method of making nanoparticles from glass, the method comprising: gathering glass waste; hammering the glass waste into ready to grind pieces; adding an amount of the ready to grind pieces into a grinding bowl of a grinding machine; adding 26 steel balls to the grinding bowl; grinding the ready to grind pieces in the grinding machine for about 15 minutes at about 600 RPM; and obtaining a powder containing the nanoparticles.

In another embodiment of the present methods, hammering the glass waste into ready to grind pieces can comprise one of manually crushing glass with one of a hammer and a mallet, grinding the glass waste in an automatic glass crusher, or grinding the glass using a balling crusher machine.

In a further embodiment of the present methods, the nanoparticles can have a density of about 2.48 g/cm$^3$.

Various uses for the produced nanoparticles, which can comprise nanosilica, as described herein, include but are not limited to, concrete additives, adhesives, paints and painting, manufacturing of polymeric material, biomedical applications, semiconductor systems, and solar systems.

An example of final results of this process are illustrated in the graph in FIG. 3. Based on laser particle-size distribution analysis and scanning electron microscope (SE) analysis, the presence of nano-sized glass particles is confirmed using laser particle-size distribution analysis as shown in FIG. 4. The calculated density of nano-GP particles is about 2.48 g/cm$^3$. The dried powder is ready now for the use in various applications as described herein.

It is to be understood that embodiments of the method for producing glass waste powder as a precursor for the production of nanosilica as described herein are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making nanoparticles from glass, the method comprising:
   gathering glass waste;
   hammering the glass waste into ready to grind pieces;
   providing a grinding machine having a grinding bowl;
   adding an amount of the ready to grind pieces into a grinding bowl of the grinding machine;
   adding steel balls to the grinding bowl;
   grinding the ready to grind pieces; and
   obtaining a powder containing the nanoparticles
   wherein the nanoparticles have a density of about 2.48 g/cm$^3$.

2. The method of making nanoparticles from glass of claim 1, wherein the hammering the glass waste into ready to grind pieces comprises manually crushing glass with one of a hammer and a mallet.

3. The method of making nanoparticles from glass of claim 1, wherein the hammering the glass waste into ready to grind pieces comprises grinding the glass waste in an automatic glass crusher, or a balling crusher machine.

4. The method of making nanoparticles from glass of claim 1, wherein the hammering the glass waste into ready to grind pieces comprises grinding the glass using a balling crusher machine.

5. The method of making nanoparticles from glass of claim 1, wherein the grinding bowl has a capacity of 80 mL to 500 mL.

6. The method of making nanoparticles from glass of claim 1, wherein 20 steel balls are added to the grinding bowl.

7. The method of making nanoparticles from glass of claim 1, wherein the grinding bowl is in the grinder machine and the grinder machine has a motor with a speed of about 300 RPM.

8. The method of making nanoparticles from glass of claim 7, wherein the motor is run continuously for about 300 minutes with about 10-minute intervals between rotations.

9. The method of making nanoparticles from glass of claim 1, wherein the grinding bowl has a capacity of 12 mL to 500 mL.

10. The method of making nanoparticles from glass of claim 9, wherein 26 steel balls are added to the grinding bowl.

11. The method of making nanoparticles from glass of claim 10, wherein grinding the ready to grind pieces comprises running a grinding machine at about 600 RPM for at least about 15 minutes.

12. The method of making nanoparticles from glass of claim 1, wherein the steel balls have a volume about 4.5 times greater than a volume of the ready to grind pieces.

13. The method of making nanoparticles from glass of claim 1, wherein the nanoparticles are spherical and have a particle size of less than 50 nm.

14. A method of making nanoparticles from glass, the method comprising:
gathering glass waste;
hammering the glass waste into ready to grind pieces;
providing a grinding machine having a grinding bowl;
adding an amount of the ready to grind pieces into a grinding bowl of the grinding machine;
adding 20 steel balls to the grinding bowl;
grinding the ready to grind pieces in the grinding machine for about 300 minutes at about 300 RPM; and
obtaining a powder containing the nanoparticles
wherein the nanoparticles have a density of about 2.48 g/cm$^3$.

15. The method of making nanoparticles from glass of claim 14, wherein the hammering the glass waste into ready to grind pieces comprises one of manually crushing glass with one of a hammer and a mallet, grinding the glass waste in an automatic glass crusher, or grinding the glass using a balling crusher machine.

16. A method of making nanoparticles from glass, the method comprising:
gathering glass waste;
hammering the glass waste into ready to grind pieces;
providing a grinding machine having a grinding bowl;
adding an amount of the ready to grind pieces into a grinding bowl of the grinding machine;
adding 26 steel balls to the grinding bowl;
grinding the ready to grind pieces in the grinding machine for about 15 minutes at about 600 RPM; and
obtaining a powder containing the nanoparticles
wherein the nanoparticles have a density of about 2.48 g/cm$^3$.

17. The method of making nanoparticles from glass of claim 16, wherein the hammering the glass waste into ready to grind pieces comprises one of manually crushing glass with one of a hammer and a mallet, grinding the glass waste in an automatic glass crusher, or grinding the glass using a balling crusher machine.

\* \* \* \* \*